Figure 1:
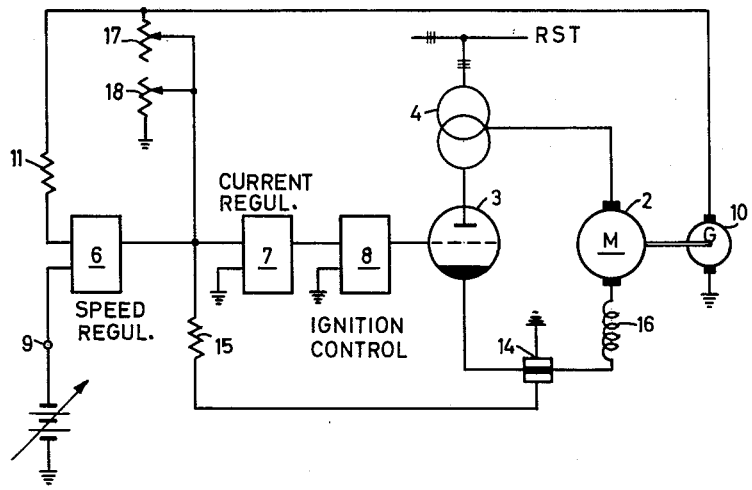

United States Patent Office 3,086,156
Patented Apr. 16, 1963

3,086,156
APPARATUS FOR CONTROLLING A POWER-RECTIFIER SYSTEM
Heinz Geissing, Erlangen, Germany, assignor to Siemens-Schuckertwerke Aktiengesellschaft, Berlin-Siemensstadt, Germany, a corporation of Germany
Filed Aug. 17, 1960, Ser. No. 50,185
Claims priority, application Germany Aug. 20, 1959
3 Claims. (Cl. 318—308)

My invention relates to means for operating controlled power rectifiers, particularly for energizing regulated electric drives, in which the ignition control of the individual rectifier members is limited to two pre-selected ignition-angle values, one in the cycle range of rectifier performance and the other in the inverter range, and in which an inertia-free electronic regulator abruptly switches the ignition angle from one to the other value in response to directional change in departure of the regulated quantity from a given datum (pattern) value. Such systems of control are disclosed in the copending application Serial No. 850,633, filed November 3, 1959, and in my copending application Serial No. 47,768, filed August 5, 1960, both assigned to the assignee of the present invention.

If in the systems of this type the load circuit energized from the power rectifier generates a counter-electromotive force, the latter may cause the mean value of rectified current to depart from the prescribed datum value. The departure depends upon the magnitude of the counter-electromotive force (counter voltage) as well as upon the time constant of the load circuit, and can be explained as follows. During rectifier operation, i.e. when the mean value of rectified voltage is higher than the counter voltage, the maximum values of direct current at which each time the power rectifier is switched, for example from full rectifier operation to optimal inverter operation, are equal to the datum value. However, during inverter operation, i.e. when the mean value of rectified voltage is lower than the counter voltage, the minimum values of the direct current at which each time the power rectifier is switched, for example from highest permissible inverter operation to rectifier operation, are approximately equal to the datum value. Consequently, the overall mean value of the direct current is smaller durinng rectifier operation and larger during inverter operation than the prescribed datum value.

It is an object of my invention to improve the accuracy of the control and regulation performance by correcting any such regulating departures in power-rectifier systems of the above-mentioned type.

It is another object of my invention to devise a current regulating system of the type above described which is particularly well capable for accurately controlling and regulating the speed of a direct-current motor energized from the power rectifier.

According to one feature of my invention, predicated upon rectifier control on the principles disclosed in the above-mentioned application Serial No. 850,633 and briefly described above, I control the ignition-angle switching meanns of the system by a constant-current regulator and supply this regulator not only with a pilot magnitude dependent upon the load current of the rectifier system but also with an auxiliary voltage which varies in magnitude and polarity with the counter-electromotive force produced by the motor or other load, and I apply the auxiliary voltage to the input circuit of the current regulator in the polarity sense required to increase the effective datum value for the current regulator during rectifying operation, while decreasing this datum value during inverting operation.

Figure 2:
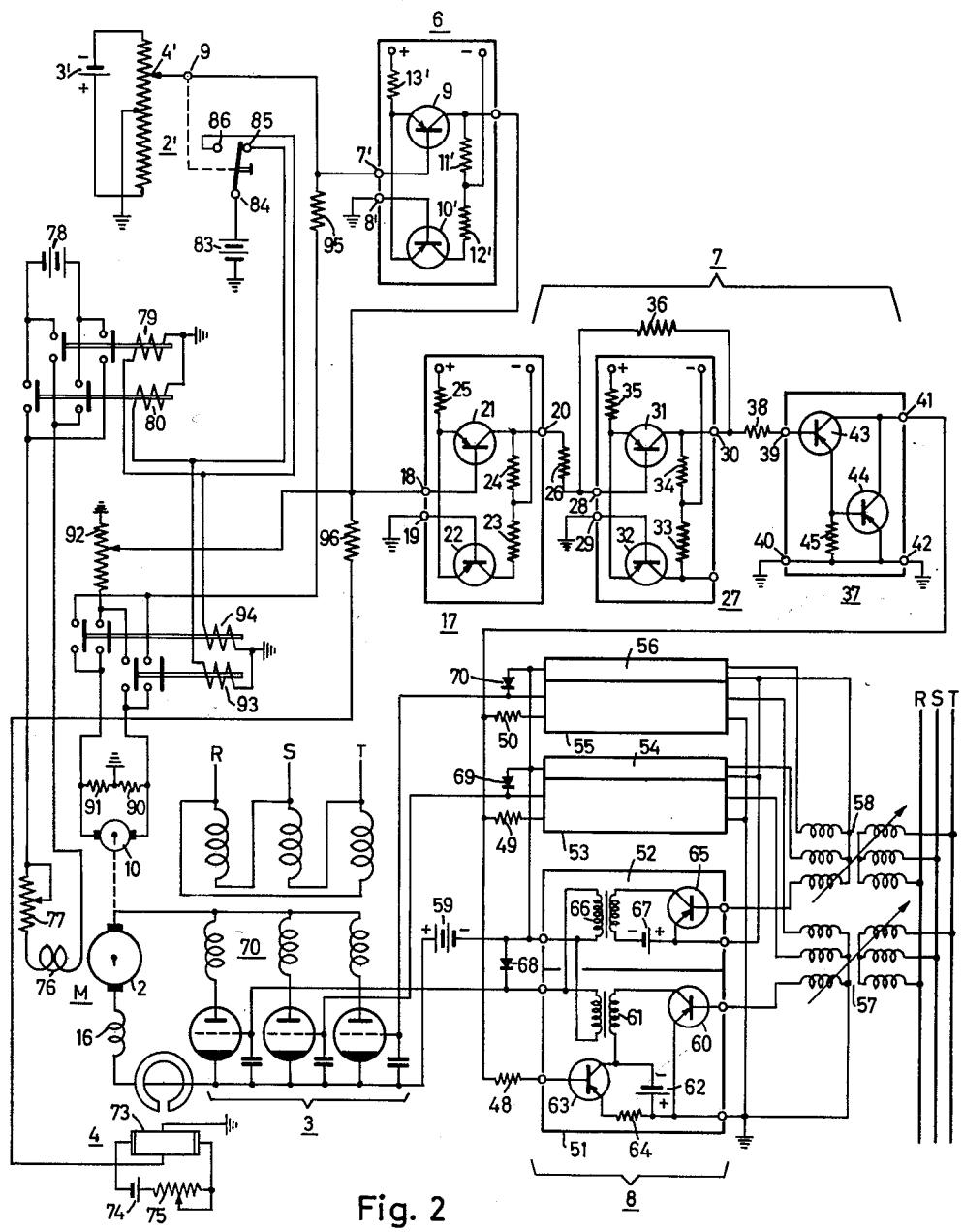

The foregoing and other objects and features of my invention will be apparent from, and will be described in, the following with reference to the embodiment of a rectifier-control system for operation of a motor according to the invention illustrated by way of example on the accompanying drawings in which FIG. 1 is a schematic block diagram and FIG. 2 a detailed circuit diagram of the system.

According to the diagram of FIG. 1, a direct-current motor M is supplied with controlled and regulated power from a three-phase alternating-current line RST through a rectifier 3 energized from the line by a power transformer 4. The armature 2 of the motor M is connected in the load circuit of the rectifier 3 in series with a current-responsive sensing member 14 and in series with a smoothing reactor 16.

The recurrent ignition moments of the rectifier 3 are controlled to snap from a given ignition angle in the range of rectifier operation to another given ignition angle in the range of inverter operation in accordance with the principle set forth above and more fully explained in the application Serial No. 850,633. Such regulation is effected by means of a speed regulator 6 and a current regulator 7 acting upon an ignition-pulse generating assembly 8. The speed regulator 6 is connected at 9 to a source of adjustable pattern voltage which determines the datum speed at which the motor M is supposed to run. This pattern value is compared in the speed regulator 6 with a pilot value which is furnished from a tachometer dynamo 10 coupled with the shaft of motor 2 to provide a reversible output voltage whose magnitude and polarity depend upon the speed and running direction respectively of the motor. The tachometer voltage is fed to the speed regulator 6 through a resistor 11. The speed regulator 6 is essentially an amplifier differentially controlled by the pattern voltage and pilot voltage to furnish an amplified output voltage proportional to the difference. This amplified difference voltage constitutes the datum value for the current regulator 7 and is impressed upon the input circuit of the regulator. The same input circuit receives a current-pilot signal from the current-responsive sensing member 14 through a resistor 15. The sensing member 14 may consist of a Hall-voltage generator such as described in my copending application Serial No. 47,768, but it will be understood that any other current-responsive source of voltage, such as an IR-drop resistor in the load circuit, may be used instead.

The current regulator 7 is essentially an amplifier whose input circuit responds differentially to the speed error signal received from the speed regulator 6 and the current-pilot signal received from the sensing member 14. The pulses issuing from the current regulator 7 to the ignition-angle control unit 8 have the effect of shifting the ignition pulses for the rectifier 3 between the above-mentioned two fixed ignition-angle values.

During starting of the motor M, the counter-electromotive force of the armature 2 increases with increasing speed and has the effect that the mean value of direct current in the armature circuit departs from the desired datum value. The departure is a maximum when the desired speed signaled by the speed regulator 6 is reached.

The counter-electromotive force of the motor M is approximately proportional to its speed. For that reason, an auxiliary voltage suitable for correcting the operation of the current regulator 7 can be taken, for example, from the tachometer machine 10 which is provided for response to the motor speed. This voltage is impressed upon the input circuit of the current regulator 7. The magnitude of the departure also depends upon the waviness of the direct current which is determined by the time constant of the load circuit. When energizing an electric motor, as is the case in the embodiment here described, the time constant of the load circuit is determined by the inductivity of the armature winding and the smoothing reactor 16. The time constant can be taken into account simply by feeding the auxiliary voltage from tachometer 10 to the input circuit of current regulator 7 through adjustable resistors 17 and 18 of a potentiometer. The auxiliary voltage thus impressed upon the input circuit of the current regulator decreases the current-datum value continuously issuing from the speed regulator 6 with increasing motor speed up to a maximum value which is adjustable at the potentiometer, and thus compensates the otherwise occurring reduction of the direct-current mean value relative to the datum value. When the actual current value reaches the corrected datum value, constituted by the sum of the current supplied from the speed regulator 6 and the additional current supplied through the potentiometer resistors 17 and 18, the current regulator 8 changes the polarity of its output pulses and the ignition-angle control assembly 8 issues to the power rectifier 3 ignition pulses for inverter operation at the proper phase angle, for example $\alpha=150°$. As a result, the load current drops rapidly, and the control assembly 8 again issues ignition pulses at the ignition angle $\alpha=0$ as soon as the actual current value in the load circuit passes below the new datum value. The current, however, declines until the next-following rectifier-valve member of the power rectifier is ignited by the ignition pulse. From this moment on, the current in the load circuit again increases until the new datum value is again reached, and the shift in ignition control repeats itself.

If the motor M is operated to run in both directions of rotation so that it is necessary to brake the motor down to zero and to accelerate it in the opposite direction, the necessary switching of the armature circuit or field circuit of the motor and the resulting transfer from rectifying to inverting operation, must be accompanied by a change in polarity of the auxiliary voltage supplied through rheostats 17, 18 to the input circuit of the current regulator 7. This can be done simply by means of auxiliary contacts on the speed-reversing switch used for changing the motor running direction.

In accordance with the effect of the counter-electromotive force during inverter operation of the power rectifier, the auxiliary voltage supplied from tachometer 10 through rheostats 17, 18 to the current regulator 7 is so directed that the datum value imposed by the speed regulator 6 upon the current regulator is diminished. When the rotating speed passes through the zero value, the voltage of the tachometer 10, hence the auxiliary voltage, changes its polarity automatically, so that the datum value in the input circuit of the current regulator is again increased for the next-following rectifier operation of the power rectifier during the accelerating period of the motor in the reverse direction.

Details of the system will now be described with reference to FIG. 2.

The source of adjustable and reversible pattern voltage for the speed regulator 6 is constituted by a potentiometer rheostat 2′ energized from a direct-current source 3′ of constant voltage. Rheostat 21 has a grounded mid-tap so that its slider 4′ can be adjusted to any desired positive or negative pattern voltage in accordance with the desired forward or reverse speed of the motor M. The slider 4′ is electrically connected to the input terminal 7′ of the speed regulator 6 to impress its potential upon the base of a transistor 9′. The base of a second transistor 10′ is connected through the second input terminal 8′ of the speed regulator 6 to ground (zero) potential. The emitters of transistors 9′ and 10′ are connected to the positive potential of a constant direct-voltage supply through a resistor 13′. The respective collectors are connected through resistors 11′ and 12′ to the negative potential of the same supply. The output terminal 14′ of speed regulator 6 is connected with the input terminal 18 of the current regulator 7.

The current regulator 7 is composed of a pre-amplifier 17, a flip-flop amplifier 27 and a power amplifying stage 37. The second input terminal 19 of pre-amplifier 17 is connected to zero potential. The output terminal 20 of the pre-amplifier is connected through a resistor 26 with the input terminal 28 of the flip-flop amplifier 27, whose second input terminal 29 is connected to zero potential. The output terminal 30 of the amplifier 27 is coupled with the input terminal 28 of the same amplifier 27 through a resistor 36 which constitutes a positive feedback and causes the desired bistable flip-flop performance of the amplifier 27. Each of the amplifiers 17 and 27 has the same internal circuitry as the above-described speed regulator 6.

The output terminal 30 of amplifier 27 is connected through a resistor 38 and the input terminal 39 of the power amplifier 37 with the base of a transistor 43. The emitter of transistor 43 is connected to the base of another transistor 44 and is also connected through a resistor 45 with the second input terminal 40 which is at zero potential. The emitter of transistor 44 is likewise connected to zero potential. The collectors of respective transistors 43 and 44 are connected to the output terminal 37 of the current regulator 7. Terminal 41 is connected through respective resistors 38, 49, 50 with respective ignition-angle control sets 51, 53, 55 which, together with respective component sets 52, 54 and 56, constitute the ignition-control assembly 8.

The ignition-angle control sets 51, 53 and 55 are phase-adjusted for issuing ignition pulses at the ignition angle $\alpha=0$ for full rectifier control of the power rectifier 3. The component sets 52, 53, 56 are adjusted for issuing ignition pulses in the range of inverter operation, for example at an ignition angle $\alpha=150°$. The internal circuitry of the three sets is identical so that only the circuits of control set 51 need be illustrated and described in detail.

For adjusting the ignition angle $\alpha=0$, the sets 51, 53, 55 are energized from the alternating-current line RST through a phase-shift transformer 37. The phase position of the secondary transformer voltage is to be adjusted relative to the line voltage so that the transistor 60, whose base is connected with the secondary winding of phase R in transformer 57, is turned on at the moment $\alpha=0$. Thus, the transistor 60 issues an ignition pulse at the angle $\alpha=0$ through a pulse transformer 61 to the control grid of the rectifier valve in phase R of the power rectifier 3. This rectifier is illustrated, for example, to comprise three mercury-pool rectifier tubes energized from the secondary windings 70 of a power transformer whose primary windings are connected to the above-mentioned supply line RST.

The ignition-angle control set 51 is further provided with a transistor 63 which serves to suppress the ignition pulse $\alpha=0$ whenever inverter operation of the power rectifier 3 is required. The transistor 63 is turned on when the transistor 44 is turned off because of the arrival of a negative output signal from the flip-flop amplifier 27 cordingly, when the voltage polarity at the outlet terminal 14 reverses because of inverter operation, the tachometer voltage is opposed to the voltage of the speed regulator 6 and thus simulates at input terminal 18 of pre-amplifier 17 a reduction in datum value.

Reduction of Speed

Assume that the motor M is running at the proper speed and that this speed is to be reduced by shifting the slider 4' of the control potentiometer 2' closer to the zero position. As a result, the positive pilot value of speed supplied through the resistor 95 preponderates over the input signal at terminal 7' of speed regulator 6, and the power rectifier 3 is now controlled to operate as inverter until the motor M has attained the reduced speed set by the control potentiometer 2'. In proportion to the reduction in speed, the compensating voltage passing through the potentiometer 92 onto the input terminal 18 of the pre-amplifier 17 decreases and, in this case (inverter operation) is opposed to the negative signal of the datum value from the speed regulator 6.

When the speed pattern value is set to zero by placing the slider 4' to the mid-position of potentiometer 2', the power rectifier 3 is controlled to operate as inverter in accordance with the positive signal of the speed pilot value supplied through resistor 95 to the input terminal 7 of the speed regulator 6, and such inverter operation continues until the motor 1 stops.

When the motor M is being decelerated or stopped by dynamic braking, the switch 84 is turned to position 86 thus actuating the contactor 79 in the field circuit of motor M as well as the relay 94 in the armature circuit of the tachometer. The negative signal of the speed pilot value now being supplied through the resistor 95 to the input terminal 7' of the speed regulator 6 does not change the positive output signal at output terminal 14'. The compensating voltage supplied through the potentiometer 92 to the input terminal 18 of the pre-amplifier 17 reduces the positive signal supplied from the speed regulator 6 and thus simulates an increase of the direct-current pilot value supplied from the Hall converter 4 through the resistor 96. Consequently, the motor 71, operating under full armature current, is braked down to a new speed adjusted by means of the slide contact 4' at control potentiometer 2'. When, during braking, the pilot value of load current supplied from the Hall converter 4 exceeds the datum value furnished from the speed regulator 6, the input signal at terminal 18 of pre-amplifier 17 becomes negative and the power rectifier 3 is controlled to operate as inverter until the prescribed datum value is again attained. As soon as this is the case, the switch 84 is again placed to position 85 thus again reversing the current flow direction in the field winding 76 of the motor.

Change of Running Direction

If the motor while running is to be reversed, the operation is initially the same as described above for a reduction in speed. That is, the switch 84 is placed to position 86 while the slider 4' of potentiometer 2' is shifted beyond the zero point to the position that corresponds to the desired speed in the reverse direction. Due to switching of switch 84 the current in the field winding 76 of the motor is reversed and the motor is decelerated down to zero speed and reverses its running direction. When the motor commences accelerating in the reverse direction, the signal from tachometer 10 changes its polarity and a positive speed pilot signal is applied to the input terminal 7' of the speed regulator 6 through relay 94 and resistor 95. As soon as this positive signal exceeds the magnitude of the negative speed datum value supplied from the potentiometer 2' through slide contact 4', the transistor 9' is turned off. This occurs when the motor has attained the desired speed prescribed by the new setting of the slide contact 4'. Simultaneously, a compensating voltage from tachometer 10 is impressed through the potentiometer rheostat 92 upon the input terminal 18 of the pre-amplifier 17. While the motor is being accelerated in the reverse direction, this compensating voltage has the same direction as the positive datum signal supplied from the speed regulator 6.

As a result, an increase in datum value is simulated at input terminal 18. When the motor exceeds the speed adjusted at the control potentiometer 2' and, accordingly, the signal at the output terminal 14 of speed regulator 6 changes its polarity, the compensating voltage is opposed to the negative input signal at terminal 18 of pre-amplifier 17 and acts like a reduction in datum value thus shifting the control of the power rectifier 3 for inverter operation.

I claim:

1. A rectifier system, comprising an alternating-current line, a direct-current load of the type producing a counter-electromotive force, valve-action rectifier means connecting said line with said load and having respective control electrodes, ignition-angle control means having an energizing circuit connected to said line to be synchronized with the line voltage and having ignition pulse means connected to said control electrodes for shifting the rectifier firing moments relative to the line-voltage cycle, said ignition-angle control means having two fixed pulse phase positions in the cycle ranges of rectifying and inverting operations respectively of said rectifier means, a source of pattern voltage, current-responsive means connected with said load to provide a pilot voltage variable in dependence upon the rectified current of said load, a current regulator having an input circuit to which said pattern voltage and said pilot voltage are connected in mutually opposed polarity relation so as to jointly supply to said current regulator an error signal of reversible polarity depending upon upward and downward departures of said pilot voltage from said pattern voltage, said current regulator having an output circuit connected to said ignition-angle control means for controlling the latter to abruptly switch the rectifier ignition moments between said two fixed phase positions in dependence upon polarity reversal of said error signal for regulating the load current in accordance with said pattern voltage, auxiliary voltage means connected with said load for providing an auxiliary voltage varying in magnitude and polarity substantially in accordance with said counter-electromotive force, said auxiliary voltage means being connected with said regulator input circuit in the polarity sense required to combine with said pattern voltage additively during rectifier operation and subtractively during inverter operation, whereby the effective datum value for said current regulator is increased and decreased for rectifier and inverter operations respectively.

2. A rectifier system, comprising an alternating-current line, a direct-current motor, valve-action rectifier means connecting said line with said motor and having respective control electrodes, ignition-angle control means having an energizing circuit connected to said line to be synchronized with the line voltage and having ignition pulse means connected to said control electrodes for shifting the rectifier firing moments relative to the line-voltage cycle, said ignition-angle control means having two fixed pulse phase positions in the cycle ranges of rectifying and inverting operations respectively of said rectifier means, a source of pattern voltage, current-responsive means connected with said load to provide a pilot voltage variable in dependence upon the rectified current of said load, a current regulator having an input circuit to which said pattern voltage and said pilot voltage are connected in mutually opposed polarity relation so as to jointly supply to said current regulator an error signal of reversible polarity depending upon upward and downward departures of said pilot voltage from said pattern voltage, said current regulator having an output circuit connected to said ignition-angle control means for causing a negative voltage drop at the input resistor 48. When this occurs, the transistor 63 closes a short-circuit of the ignition-voltage source 62 through a resistor 64.

Another phase-shift transformer 58 connected to line RST is provided for adjusting the ignition angle of the control sets 52, 54, 56. The secondary voltage of transformer 58 has the effect of rendering a transistor 65 conductive at the desired ignition moment, for example at $\alpha = 150°$. Connected in the load circuit of the transistor 65 in series with a source 67 of ignition voltage, is the primary winding of a pulse transformer 66 which passes a positive ignition pulse to the control grid of the valve member in phase R of power rectifier 3. This positive pulse at $\alpha = 150°$ remains ineffective as long as a positive output signal of the current regulator 7 causes full rectifier control of the power rectifier, because then the pulse at $\alpha = 150°$ occurs at a moment when the valve member is already conducting.

Connected parallel to the secondary windings of the pulse transformers are respective diodes 68, 69 and 70 which serve to block the negative pulses.

Connected in the common cathode lead of the valve members in power rectifier 3 is a source 59 of cut-off bias voltage. The direct-current load circuit of power rectifier 3 includes the armature 2 of the motor M in series with a smoothing reactor 16 and the Hall converter 4. The semi-conductor plate 73 of converter 4 is energized through an adjustable resistor 75 by constant current from a current source 74. Under these conditions, the output voltage of the Hall converter is proportional to the load current flowing in the armature circuit of the motor and has a polarity depending upon the flow direction of that current.

The field winding 76 of motor M is energized from a source of direct voltage 78 in series with a control rheostat 77 and under control by two reversing contactors 79 and 80. They serve for reversing the excitation of field winding 76 when the running direction of the motor 71 is to be reversed.

Mechanically coupled with the armature 2 of motor M is the above-mentioned tachometer dynamo 10. Two series-connected resistors 90 and 91 are connected parallel to the armature of the tachometer. The mid-point between resistors 90 and 91 is grounded. The armature circuit of tachometer 10 includes the respective contacts of two relays 93 and 94 which are energized from a voltage source 83 in dependence upon the selected position of a motor-reversing control switch 84. The armature circuit of the tachometer 89 is connected through relays 93, 94 with the input terminal 7' of the speed regulator 6. The tachometer circuit is further connected with the input terminal 18 of the pre-amplifier 17 through a potentiometer resistor 92 one end of which is grounded.

The control system operates as follows:

*Starting the Motor*

Assume that the supply line RST and the constant-voltage supply for the regulator 6 and the current regulator 7 are energized so that the system is in operative condition. The slider 4' of control rheostat 2' is to be displaced from the zero point to the position that corresponds to the running direction and speed at which the motor M is to be operated. Assume that for forward run of the motor M the slider 4' is to be placed into the illustrated position in which the source 3' of pattern voltage supplies a negative signal to the input circuit of the speed regulator 6. With this setting of slider 4', the contact 85 of reversing switch 84 is closed, also as shown. The switch 84 is mechanically or electrically coupled with the slider 4' so that contact 85 closes when the slider 4' is moved from the zero point to an upward position corresponding to forward run of the motor, whereas the contact 86 closes when the slider 4' is moved downwardly to a position corresponding to a reverse run of the motor.

The negative signal from slide contact 4' is impressed upon the base of transistor 9' in speed regulator 6. In the closed position 85 of switch 84, the forward contactor 80 is energized and closes its contact, and relay 93 is energized to close its contacts in the circuit of the tachometer 10. As long as the negative signal from control potentiometer 4' is larger than the positive pilot voltage supplied from tachometer 10 through the resistor 95, the transistor 9' remains turned on and the output signal at terminal 14' of the speed regulator 6 is positive. This output signal appears at the input terminal 18 of the preamplifier 17. Consequently, the transistor 21 of preamplifier 17 remains turned off and an amplified negative output signal appears at output terminal 20 and is passed through the resistor 26 to the input terminal 28 of the flip-flop amplifier 27 where it has the effect of turning the transistor 31 on. As a result, the output signal of the flip-flop amplifier 27 remains positive, and the transistor 43 in the power amplifier 37 remains turned off. Thus, the transistor 44 of the power amplifying stage 37 as well as the transistor 63 of the ignition-angle control set 51 remain blocked, and the control set 51 issues through transistor 60 and pulse transformer 61 an ignition pulse to power rectifier 3 at the ignition angle $\alpha = 0$ for full rated rectifying operation of the power rectifier.

During operation, the Hall converter 73 furnishes a negative signal corresponding to the average value (pilot value) of the direct current in the armature circuit. When this negative signal from Hall converter 4 exceeds the datum value furnished from the output terminal 14' of the speed regulator 6, the input signal at terminal 18 of pre-amplifier 17 becomes negative. Consequently, the transistors 43 and 44 are turned on. The transistor 63 of ignition-angle control set 51 is made conductive and the control-voltage source 62 is short-circuited through the resistor 64, so that the ignition pulses for full rectifying operation are suppressed. As a result, the ignition pulses of control set 52 become effective and the power rectifier 70 will now operate as an inverter until the starting current prescribed by the speed regulator 6 is again attained. Consequently, during starting of the motor the current is automatically limited to the permissible value.

As soon as the speed prescribed by the setting of the speed control rheostat 2' is exceeded, the positive pilot signal of speed supplied from tachometer 10 through resistor 95 preponderates over the negative speed signal supplied from the control potentiometer 2'. Now the input signal at terminal 7' of the speed regulator 6 becomes positive. The transistor 9' is turned off and the output signal at terminal 14' becomes negative. This causes the transistor 21 to be turned on. The output terminal 20 of the pre-amplifier 17 receives a positive output signal, and the transistor 31 in the flip-flop amplifier 27 is turned off. The negative output signal at terminal 30 renders the transsistors 43, 44 and 63 conductive. The control-voltage source 62 is short-circuited through the resistor 64, and the power rectifier 3 receives from control set 52 ignition pulses for inverter operation. The resulting reduction in rectified current causes the motor speed to decline under the influence of the load being driven, until the speed passes below the speed prescribed by the speed regulator 6.

Simultaneously, the voltage from tachometer 10 is applied by relay 93 and potentiometer 92 to the input terminal 18 of the pre-amplifier 17. It compensates the departure of the average current value from the prescribed datum value in such a manner that during starting operation and full control of the power rectifier for rectifying performance ($\alpha = 0$), the tachometer voltage at terminal 18 has the same direction as the datum value supplied from the speed regulator 6. Hence, the tachometer voltage has the effect of simulating at input terminal 18 of pre-amplifier 17 an increase in datum value. Accontrolling the latter to abruptly switch the rectifier ignition moments between said two fixed phase positions in dependence upon polarity reversal of said error signal for regulating the load current in accordance with said pattern voltage, a tachometer generator connected with said motor to provide reversible auxiliary voltage indicative of speed and running direction of said motor, and circuit means connecting said generator with said regulator input circuit in the polarity sense required to combine with said pattern voltage additively during rectifier operation and subtractively during inverter operation, whereby the effective datum value for said current regulator is increased and decreased for rectifier and inverter operation respectively.

3. A rectifier system according to claim 1, comprising an adjustable potentiometer connected with said auxiliary voltage means and having an adjustable voltage output means connected to said regulator input circuit.

No references cited.